United States Patent [19]
Riddell

[11] Patent Number: 4,896,627
[45] Date of Patent: Jan. 30, 1990

[54] ANT PROOF PET DISH

[76] Inventor: Douglas C. Riddell, Harvey, La.

[21] Appl. No.: 320,393

[22] Filed: Mar. 8, 1989

[51] Int. Cl.$^4$ ............................................. A01K 39/04
[52] U.S. Cl. .................................... 119/51.5; 119/61
[58] Field of Search ................................. 119/61, 51.5

[56] References Cited

U.S. PATENT DOCUMENTS

| | | | |
|---|---|---|---|
| 2,191,811 | 2/1940 | Trampier | 119/51.5 |
| 3,441,003 | 4/1969 | DuMord et al. | 119/61 |
| 3,782,332 | 1/1974 | Depenthal et al. | 119/51.5 |
| 4,128,080 | 12/1978 | Havey | 119/51.5 |

Primary Examiner—John Weiss
Attorney, Agent, or Firm—Jerry T. Kearns

[57] ABSTRACT

An ant proof pet dish includes a base receptacle, and an intermediate receptacle overlying and completely covering an open top surface of said base receptacle and spaced slightly thereabove. An upper receptacle is supported slightly above the intermediate receptacle. In use, the base receptacle is filled with a fluid such as water or a non toxic insect inhibiting fluid. The intermediate receptacle is filled with water for a pet to drink and the other receptacle is filled with pet food. The animal is prevented from accessing the base receptacle, which forms a fluid filled moat to prevent ants and other crawling insects from accessing the water and food receptacles. An outwardly extending projection may be formed on the base receptacle and provided with a removable cover to enable filling of the base receptacle with a fluid. A plurality of cooperating posts and sockets are utilized to removably secure the receptacles in a parallel slightly spaced relation. An overflow conduit may be provided along with a fluid coupling extending through a side wall of the intermediate receptacle to enable remote and simultaneous filling of both the base and intermediate receptacles.

3 Claims, 4 Drawing Sheets

ANT PROOF PET DISH

BACKGROUND OF THE INVENTION

1. Field of the Invention

The present invention relates to pet dishes, and more particularly pertains to a new and improved pet dish designed to prevent ants and other crawling insects from contaminating the food and water supply of a pet.

2. Description of the Prior Art

Various types of pet dishes are known in the prior art. A typical example of an insect inhibiting pet dish is to be found in U.S. Pat. No. 4,007,711, which issued to J. Michael on Feb. 15, 1977. This patent discloses a telescoping variable height pet dish having a central food bowl with a pet operable lid and a annular moat type water trough secured around the central bowl. This construction allows access by the pet to the fluid within the insect inhibiting moat. The animal may thus drain the moat, destroying the insect barrier. U.S. Pat. No. 4,128,080, which issued to C. Haney on Dec. 5, 1978, discloses an insect proof animal dish which includes a food dish supported on a pillar which rises out of the water in the water dish. This patent utilizes the animal's water supply to form the insect inhibiting moat and thus does not prevent insects from contaminating the water dish. U.S. Pat. No. 4,357,905, which issued to R. Carpenter on Nov. 9, 1982, discloses a moated pet feeder which combines a food bowl and a water bowl in side by side relation. The food bowl is surrounded by a moat cavity which fills with water flowing through a substantially horizontal passage connecting the moat cavity with the water bowl to form a moat which inhibits ants and other crawling insects. This construction likewise does not separate the potentially contaminated insect inhibiting moat from the animal's water supply. U.S. Pat. No. 4,399,772, which issued to R. Salinas on Aug. 23, 1983, discloses an animal feeder which includes a bowl which is filled with water in use. An arm extends upwardly from the bowl and has a support for an animal's food dish. This construction likewise does not protect the water supply from crawling insects. U.S. Pat. No. 4,505,228, which issued to J. Scott on Mar. 19, 1985, discloses a dog feeder for protecting and preserving food or fresh water to be made available upon self-initiated action of the dog. An open tray surrounds a vessel in the form of a moat. The moat is not protected from access by the pet.

While the above mentioned devices are suited for their intended usage, none of these devices discloses a pet dish utilizing three spaced receptacles and including an inaccessible base receptacle forming a moat which prevents ants and other crawling insects from accessing not only an upper food receptacle but also an intermediate water receptacle. Inasmuch as the art is relatively crowded with respect to these various types of pet dishes, it can be appreciated that there is a continuing need for and interest in improvements to such pet dishes, and in this respect, the present invention addresses this need and interest.

SUMMARY OF THE INVENTION

In view of the foregoing disadvantages inherent in the known types of pet dishes now present in the prior art, the present invention provides an improved ant proof pet dish. As such, the general purpose of the present invention, which will be described subsequently in greater detail, is to provide a new and improved ant proof pet dish which has all the advantages of the prior art pet dishes and none of the disadvantages.

To attain this, representative embodiments of the concepts of the present invention are illustrated in the drawings and make use of an ant proof pet dish including a base receptacle, and an intermediate receptacle overlying and completely covering an open top surface of said base receptacle and spaced slightly thereabove. An upper receptacle is supported slightly above the intermediate receptacle. In use, the base receptacle is filled with a fluid such as water or a non toxic insect inhibiting fluid. The intermediate receptacle is filled with water for a pet to drink and the other receptacle is filled with pet food. The animal is prevented from accessing the base receptacle, which forms a fluid filled moat to prevent ants and other crawling insects from accessing the water and food receptacles. An outwardly extending projection may be formed on the base receptacle and provided with a removable cover to enable filling of the base receptacle with a fluid. A plurality of cooperating posts and sockets are utilized to removably secure the receptacles in a parallel slightly spaced relation. An overflow conduit may be provided along with a fluid coupling extending through a side wall of the intermediate receptacle to enable remote and simultaneous filling of both the base and intermediate receptacles.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ant proof pet dish which has all the advantages of the prior art pet dishes and none of the disadvantages.

It is another object of the present invention to provide a new and improved ant proof pet dish which may be easily and efficiently manufactured and marketed.

It is a further object of the present invention to provide a new and improved ant proof pet dish which is of a durable and reliable construction.

An even further object of the present invention is to provide a new and improved ant proof pet dish which is susceptible of a low cost of manufacture with regard to both materials and labor, and which accordingly is then susceptible of low prices of sale to the consuming public, thereby making such pet dishes economically available to the buying public.

Still yet another object of the present invention is to provide a new and improved ant proof pet dish which provides in the apparatuses and methods of the prior art some of the advantages thereof, while simultaneously overcoming some of the disadvantages normally associated therewith.

Still another object of the present invention is to provide a new and improved ant proof pet dish which includes a plurality of vertically spaced overlying receptacles to prevent ants and other crawling insects from contaminating an animal's food and water supply.

Yet another object of the present invention is to provide a new and improved ant proof pet dish which forms an insect inhibiting moat in an inaccessible base receptacle to prevent an animal from draining the moat and thus destroying the insect barrier.

Even still another object of the present invention is to provide a new and improved ant proof pet dish which has an inaccessible base receptacle connected by a fluid conduit to an intermediate drinking water receptacle to enable continuous remote filling.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
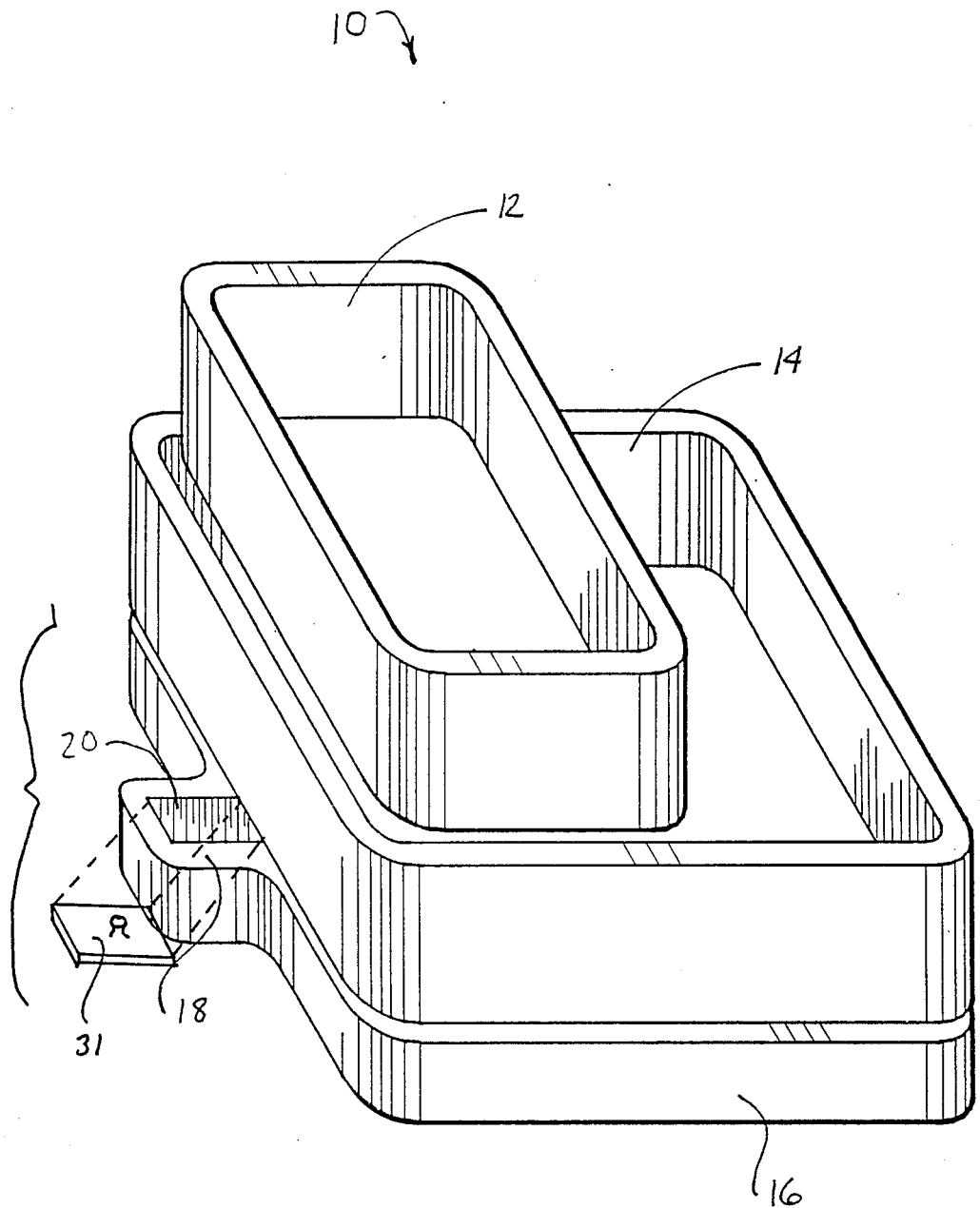
FIG. 1 is a perspective view illustrating the ant proof pet dish according to a first embodiment of the present invention.

With reference now to the drawings, and in particular to FIG. 1 thereof, a new and improved ant proof pet dish embodying the principles and concepts of the present invention and generally designated by the reference numeral 10 will be described.

More specifically, it will be noted that the first embodiment 10 of the invention includes a base receptacle 16, an intermediate receptacle 14 and an upper receptacle 12. The upper receptacle 12 is filled with pet food and the intermediate receptacle 14 is filled with a supply of drinking water for a pet. The base receptacle 16 is completely covered by the intermediate receptacle 14, but is vertically spaced therefrom. The vertical spacing prevents ants and other crawling insects from travelling up the side of the intermediate receptacle 14 and into the animal's water supply. The base receptacle 16 is provided with a laterally projecting portion 20 to enable filling the base receptacle 16 with an insect inhibiting fluid such as water. A removable cover 31 may be provided for the opening 20 in the projection 18, to prevent access by pets to the fluid contents of the receptacle 16. Thus, the animal is prevented from drinking the water in the receptacle 16, thus destroying the insect barrier. Additionally, other non-toxic insect inhibiting fluids may be utilized in the base receptacle 16, without exposure to the pets. For example, beer or a beer water mixture may be provided in the receptacle 16 to inhibit and kill snails or slugs.

Figure 2:
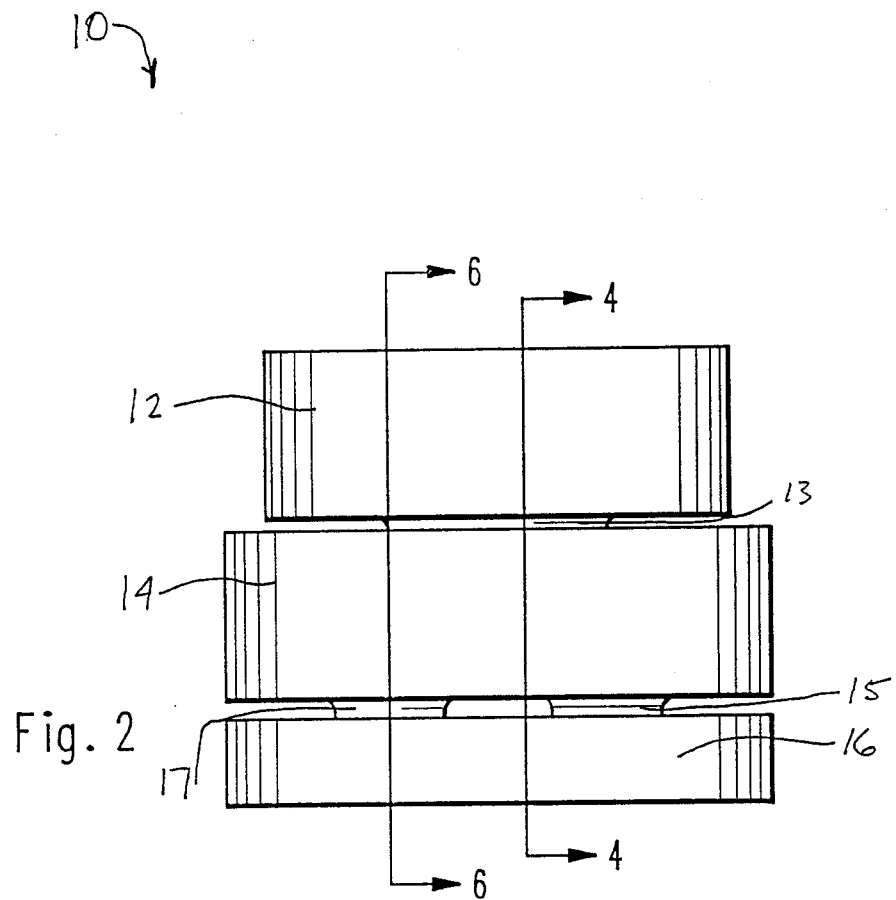
FIG. 2 is a front view illustrating the pet dish of FIG. 1.

FIG. 2 illustrates a front view of the pet dish 10 according to the first embodiment of the present invention. A plurality of sockets 13, 15 and 17 support the receptacles 12, 14 and 16 in parallel vertically spaced relation. The sockets 13, 15 and 17, and the corresponding inserted posts, to be illustrated subsequently, may be formed in a variety of shapes such as cylindrical, square, hexagonal, etc., without departing from the scope of the present invention.

Figure 3:
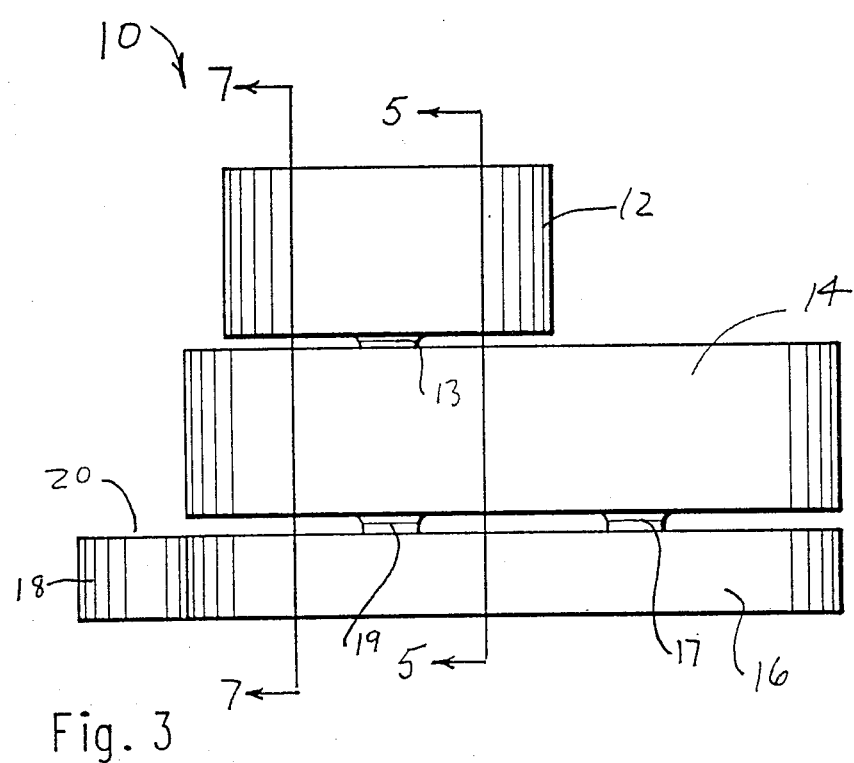
FIG. 3 is a side view illustrating the pet dish of FIG. 1.

FIG. 3 illustrates a side view of the pet dish 10 which depicts the lateral projection 18 having an opening 20 for filling the receptacle 16. An additional socket 19 is also shown. In the illustrated arrangement of the invention, four vertically extending posts and cooperating sockets are provided between the receptacle 16 and 14 and a single socket 13 and cooperating posts are utilized to support the receptacle 12 above the receptacle 14.

Figure 4:
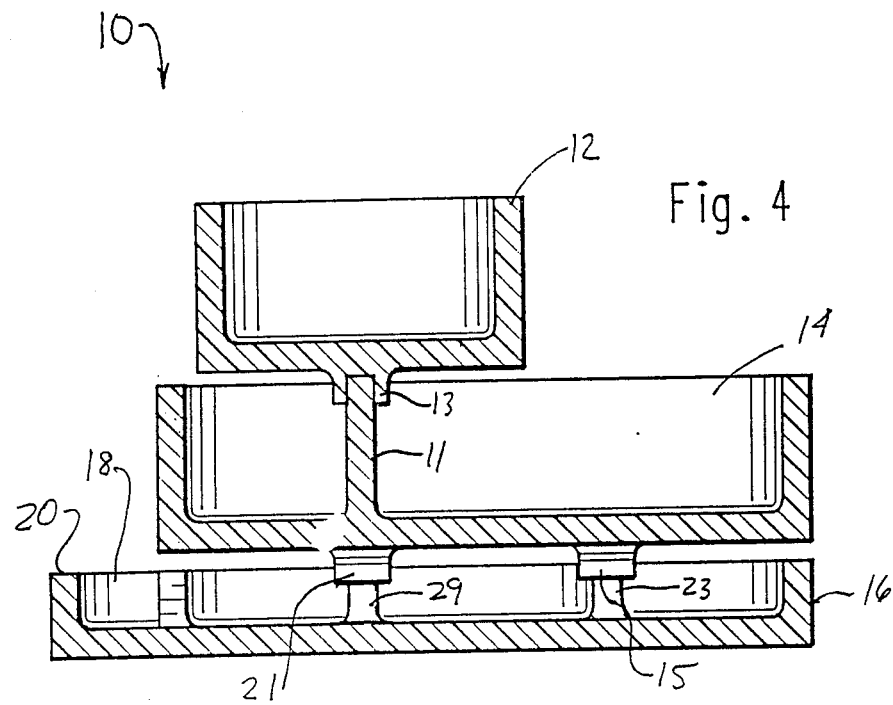
FIG. 4 is a cross sectional view, taken along line 4—4 of FIG. 2.

FIG. 4 is a cross sectional view which illustrates the generally rectangular upstanding post 11 which extends vertically upwardly from the floor of the receptacle 14 and is received in a frictional slip fit engagement within the socket 13. The base receptacle 16 is supported in a similar fashion by upstanding posts 23 and 27 engaging sockets 15 and 21.

Figure 5:
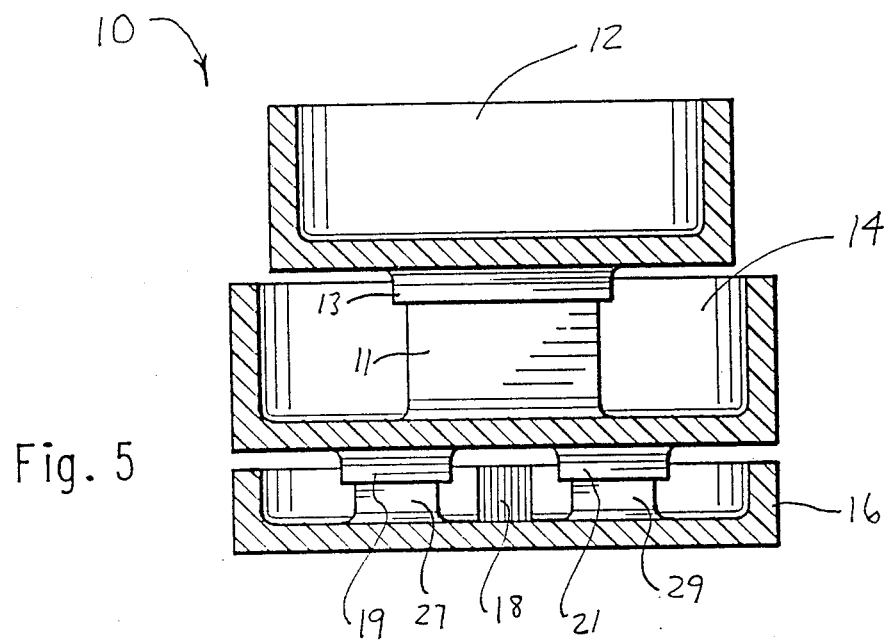
FIG. 5 is a cross sectional view, taken along line 5—5 of FIG. 3.

FIG. 5 illustrates an additional cross sectional view which further illustrates the connecting arrangements of the three spaced receptacles.

Figure 6:
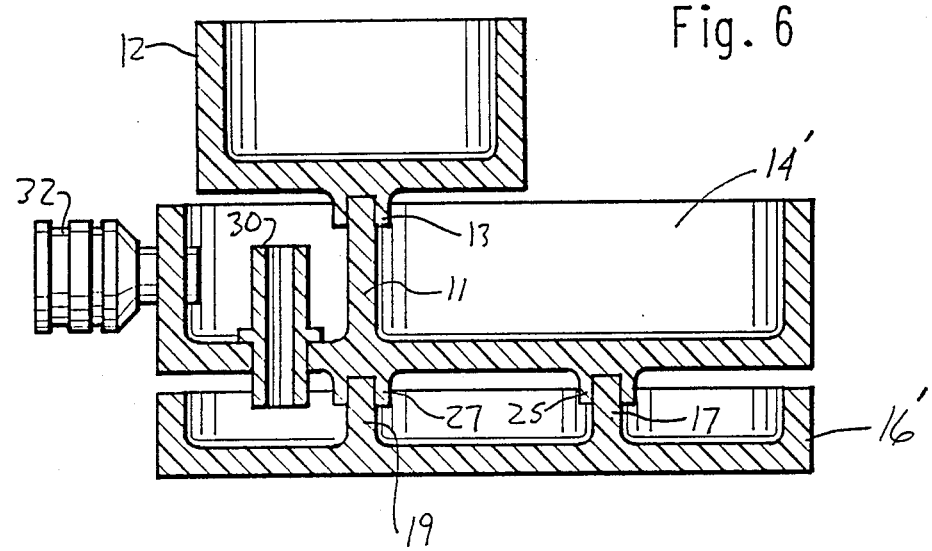
FIG. 6 is a cross sectional view, taken along line 6—6 of FIG. 2, but illustrating a slightly modified form of pet dish according to a second embodiment of the present invention.

FIG. 6 illustrates a second embodiment 10' of the present invention, which is identically constructed as described with respect to the first embodiment, with the following exceptions. The base receptacle 16' is formed without the lateral filling projection 18 illustrated in FIG. 1. In place of this filling arrangement, a vertically extending conduit 30 extends through the floor of the receptacle 14' and empties into the receptacle 16'. The upper end of the conduit 30 is disposed slightly beneath the top edge of the side wall of the receptacle 14'. Thus, when the receptacle 14' is filled above the level of the conduit 30, the overflow from the receptacle 14' will drain into the base receptacle 16'. This enables the receptacles 14' and 16' to be filled simultaneously. The volume of the base receptacle 16', the volume of the receptacle 14' and the height of the overflow tube 30 may be dimensioned such that when the receptacle 14' is filled entirely to the upper edge of the side wall, the volume of water which will drain out of the completely filled receptacle 14' is equal to the volume required to fill the receptacle 16'. At this point the water level within the receptacle 14' is lowered to the top of the conduit 30 and no further drainage will occur. A fluid coupling 32 may optionally be provided through the side wall of the receptacle 14' and coupled to a hose to enable remote filling of both the receptacles 14' and 16'. This arrangement may be employed for example in large kennels to allow each animal to have a fresh supply of water without requiring manual refilling by an attendant.

Figure 7:
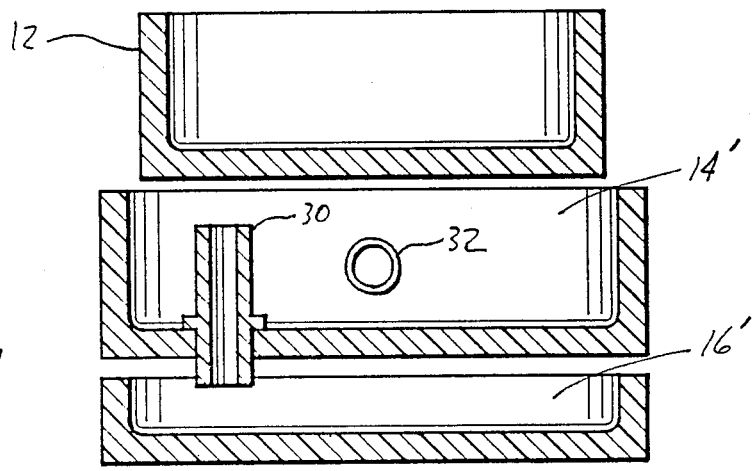
FIG. 7 is a cross sectional view, taken along line 7—7 of FIG. 3, but further illustrating the modified pet dish of FIG. 6.

FIG. 7 is an additional cross sectional view which further illustrates the arrangement of the pet dish 10' illustrated in FIG. 6.

It may thus be seen that the present invention provides an improved insect inhibiting pet dish which not only prevents access by crawling insects to both the food and water supply of an animal, but also prevents the animal from emptying the fluid filled moat, thus destroying the insect barrier.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ant proof pet dish, comprising:
   a base receptacle having vertical sidewalls for retaining an insect inhibiting fluid, said base receptacle having an open top and forming an insect inhibiting moat;
   an intermediate receptacle having vertical sidewalls and in open top for storing a quantity of drinking water for an animal, said intermediate receptacle overlying and supported in spaced relation slightly above said base receptacle with said vertical sidewalls of said base receptacle and said intermediate receptacle disposed in alignment;
   at least one upstanding post and cooperating socket securing said base receptacle and said intermediate receptacle in said overlying relation;
   said intermediate receptacle covering an entire open top of said base receptacle to prevent pets from accessing fluid in said base receptacle;
   an upper receptacle for retaining a quantity of food for an animal, said upper receptacle supported slightly above said intermediate receptacle; and
   at least one upstanding post and cooperating socket securing said upper receptacle to said intermediate receptacle.

2. The ant proof pet dish of claim 1, wherein said base receptacle includes a small projecting portion having an open top extending outwardly from beneath said intermediate receptacle for filling said base receptacle with a fluid; and
   a removable cover for closing said open top of said projecting portion to prevent animal access to fluid in said base receptacle.

3. The ant proof pet dish of claim 1, further comprising:
   a vertically extending conduit extending through a floor of said intermediate receptacle and having an outlet in fluid communication with said base receptacle, said conduit having an upper end terminating slightly below a side wall top edge of said intermediate receptacle whereby said base receptacle may be filled with fluid through said conduit from said intermediate receptacle; and,
   a fluid coupling extending through a side wall of said intermediate receptacle to enable remote fluid filling of said intermediate and base receptacles.

* * * * *